Oct. 7, 1930.    F. R. OWENS    1,777,934
PARACHUTE
Filed Nov. 21, 1928    2 Sheets-Sheet 1

Frank Roderick Owens
INVENTOR
BY Victor J. Evans
ATTORNEY

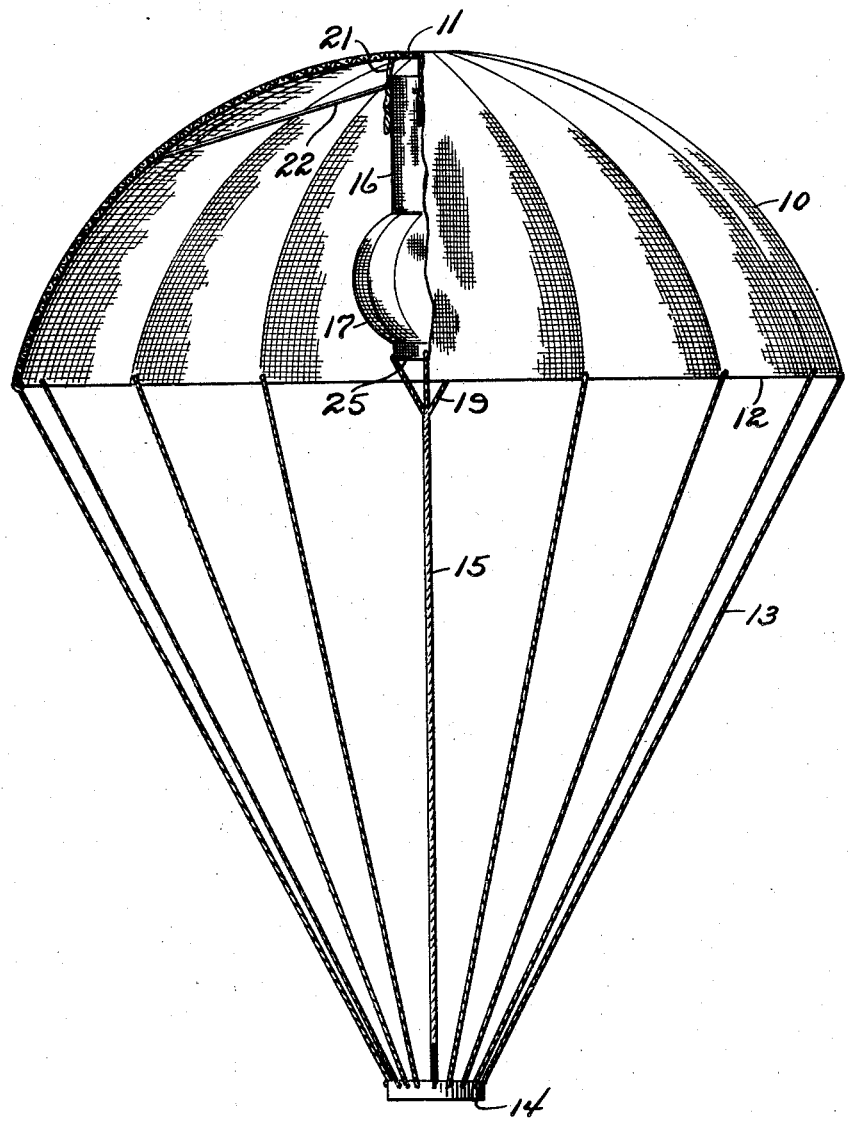

Patented Oct. 7, 1930

1,777,934

UNITED STATES PATENT OFFICE

FRANK RODERICK OWENS, OF BEAVER CROSSING, NEBRASKA

PARACHUTE

Application filed November 21, 1928. Serial No. 320,945.

The object of this invention is to provide means facilitating the opening of a parachute and assuring the commencement of the operation at the earliest practical moment after the supporting elements are rendered taut.

A further object is to provide within the dome or main portion of the parachute a tubular member formed of fabric and properly retained, this element having a lower enlarged or spherical portion with means preventing the closing of an opening at the bottom thereof, so that air will immediately enter the enlarged portion and flow to and thru the upper part of the tube, and as the enlarged portion expands it will push the skirt portion of the parachute outwardly, and on account of its spherical configuration air will be deflected around the sides of the enlarged portion and thence outwardly against the skirt portion, thereby greatly facilitating the opening or inflation of the device and overcoming a difficulty long experienced and having a material bearing on the question of safety, or constituting a matter of vital importance, as the case may be.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:

Figure 3 is a view in elevation and vertical section showing the parachute inflated, with the tubular member in the position which it will occupy after complete expansion of the device.

Figure 1:
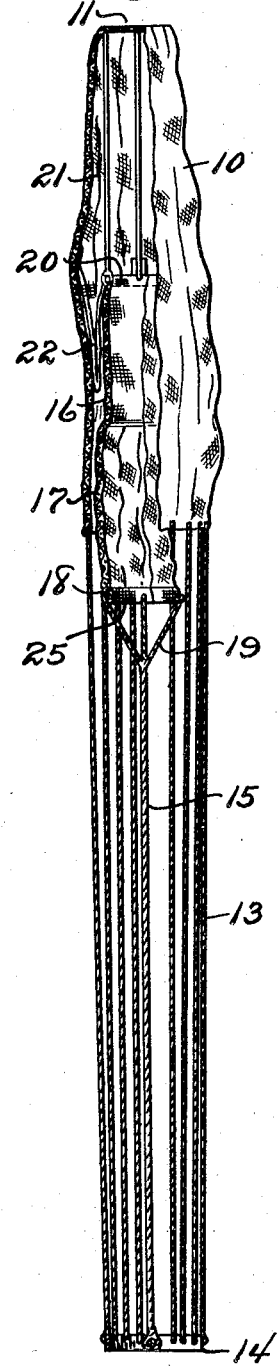
Figure 1 is a view partly in elevation and partly in vertical section, showing the parachute closed or folded.

The dome or main portion of the parachute includes the sides 10 and top 11, and the lower edge or skirt portion 12 has connected therewith the usual strings or cords 13 which are in turn connected with ring 14.

Also connected with ring 14 is a central cord or rope 15 limiting the movement of the element or elements referred to below.

A tubular element 16 of cloth or other flexible material includes a lower portion 17 which when expanded or inflated is of spherical form, and this element 17 has connected with its lower portion an annular member or suitable frame element 18 which will insure the permanent spreading of the lower portion of the spherical member, so that the device will always be in condition for the initial stage in the opening movement, permitting the immediate entrance of air. Rope 15 is connected with ring 18, and short cords or similar devices 19 serving an obvious purpose in completing the connection.

Figure 2:
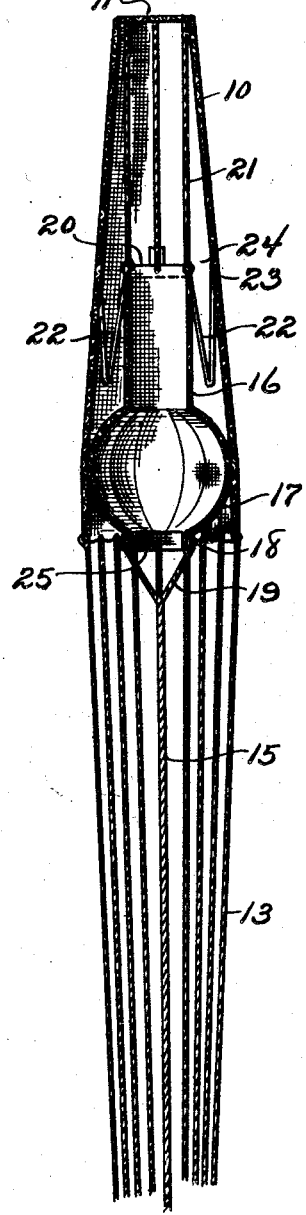
Figure 2 is a view in full vertical section.

The upper end of the tubular portion 16 includes or has connected therewith a ring 20 which in turn is connected by strings 21 with the upper central portion of the dome. A plurality of strips of cloth or the like are employed as shown in Figure 2, being there designated 22, and having one end connected or secured at 23 and the other end secured at 24 to ring 20.

Assuming that the device is to be placed in use, and weight is supported by ring 14, the annular member 18 will be held in a substantially horizontal position, air will enter at 25, and the walls of element 17 will expand, pushing outwardly the skirt portion of the dome. Air will then be deflected from the lower curved walls of element 17 and will further assist in the expansion of the skirt portion of the dome. The air will pass upwardly thru tube 16 and out of the top thereof, tending to expand the upper walls of the parachute.

Having described the invention what is claimed is:

1. In a parachute, an element constituting a dome, strings connected with the lower edge thereof, an element suspended by the strings, a flexible tubular member including a lower portion expansible above the bottom to a greater extent than at the lower edge, and of reduced cross section immediately above the point of maximum expansion, means for retaining this member within the dome, and means holding the lower end of the tubular member open to permit immediate expansion of the walls thereof against the lower portion of the dome.

2. In a parachute, an element constituting a dome, strings connected with the lower edge thereof, an element suspended by the strings, a collapsible tubular member including a lower portion expansible above the bottom to a greater extent than at the lower edge, and of reduced cross section immediately above the point of maximum expansion, means holding the lower end of the tubular member open, a cord connecting this member with the suspended element, and flexible means retaining the tubular member within the dome.

3. In a parachute, an element constituting a dome, strings connected with the lower edge thereof, an element suspended by the strings, a flexible tubular member including a lower portion expansible above the bottom to a greater extent than at the lower edge, and of reduced cross section immediately above the point of maximum expansion, means for retaining this tubular member within the dome, and means holding the lower end of the tubular member open to permit immediate expansion of the walls thereof against the lower portion of the dome.

4. In a parachute, an element constituting a dome, strings connected with the lower edge thereof, an element suspended by the strings, a flexible tubular member, means for retaining this member within the dome, said member having a lower spherical portion, and means holding the lower end of the tubular member open to permit immediate expansion of the walls thereof against the lower portion of the dome.

5. In a parachute, an element constituting a dome, strings connected with the lower edge thereof, an element suspended by the strings, a collapsible tubular member including a portion of approximately spherical configuration, means holding the lower end of the tubular member open, a cord connecting this member with the suspended element, and flexible means retaining the tubular member within the dome, the means last named including devices connected with the top of the dome and other devices connected with the sides thereof.

In testimony whereof I affix my signature.

FRANK RODERICK OWENS.